April 4, 1950 — W. G. SPURLIN — 2,502,805
MOWER ATTACHMENT FOR TRACTORS
Filed Oct. 19, 1945 — 5 Sheets-Sheet 1

INVENTOR
William G. Spurlin
By Carlson, Pitzner, Hubbard & Wolfe
ATTORNEYS

April 4, 1950          W. G. SPURLIN          2,502,805
MOWER ATTACHMENT FOR TRACTORS
Filed Oct. 19, 1945          5 Sheets-Sheet 4
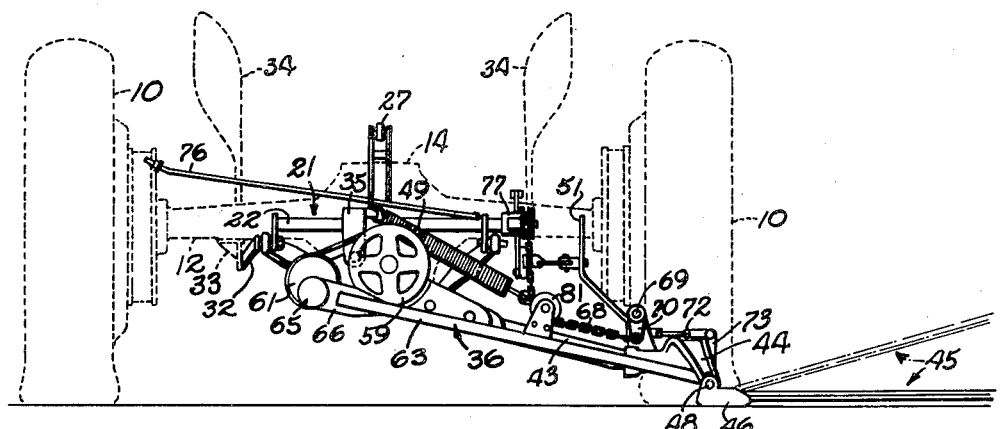
Fig. 4
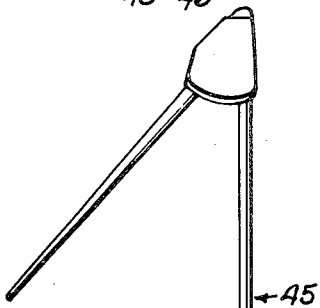
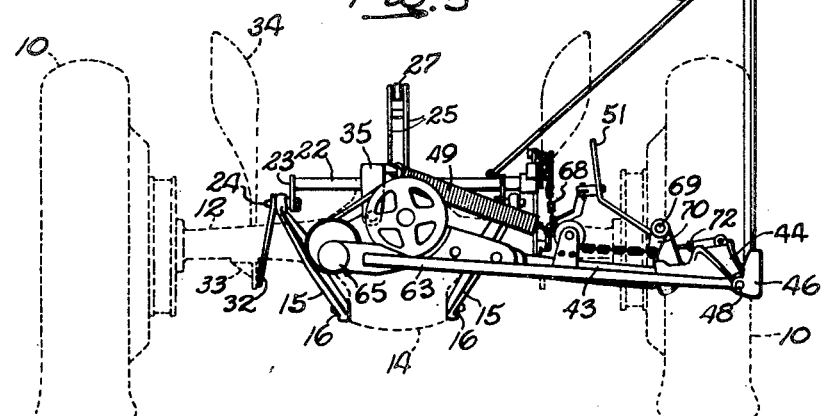
Fig. 5
INVENTOR
William G. Spurlin
By Carlson, Pitzner, Hubbard & Wolpe
ATTORNEYS

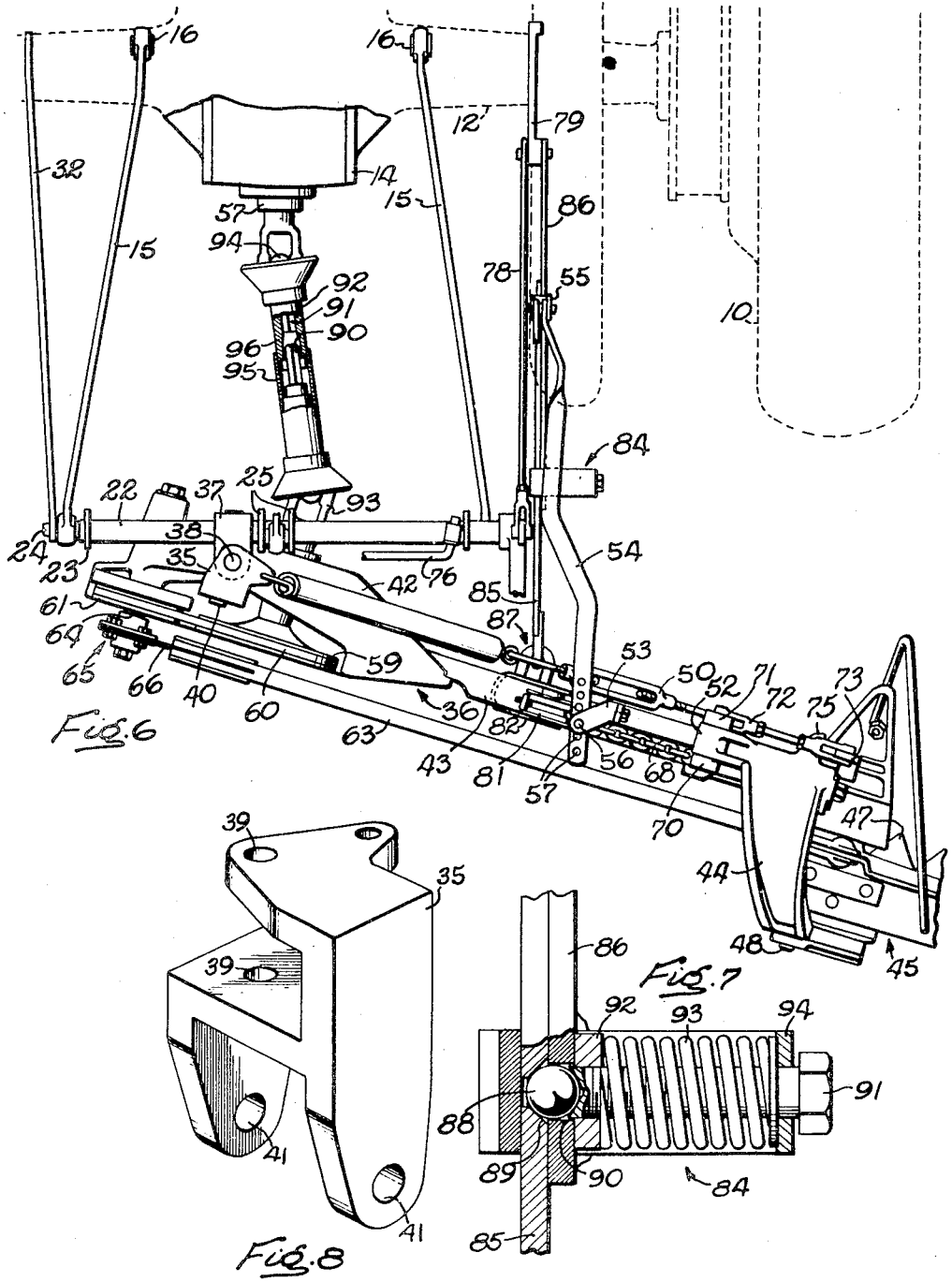

Patented Apr. 4, 1950

2,502,805

UNITED STATES PATENT OFFICE 2,502,805

MOWER ATTACHMENT FOR TRACTORS

William G. Spurlin, Dearborn, Mich., assignor to Harry Ferguson, Inc., Detroit, Mich., a corporation of Delaware Application October 19, 1945, Serial No. 623,377

15 Claims. (Cl. 56—25)

The present invention pertains generally to mowing machines and more particularly to mowers in the form of attachments for tractors, although in some of its broader aspects the invention is applicable to still other types of tractor drawn implements or attachments.

Generally stated, it is an aim of the present invention to provide a mower attachment for tractors which is of simplified low cost construction, yet rugged, safe and effective in operation on all kinds of terrain and adapted to utilize in a novel manner power derived from the tractor for its manipulation.

In a somewhat different aspect, it is an object of the invention to provide an arrangement, applicable to implements generally, for adjusting the same by power derived as an incident to lifting of the implement by a power device on the tractor.

More particularly, it is an object of the invention to provide a mower which is adapted to be attached to and manipulated by a power operated draft linkage on a tractor and in such manner that the mower may be bodily raised and its mower bar elevated with reference to the remainder of the implement in conditioning the same for transport, all simply as an incident to power raising of the draft linkage.

Another object is to provide a mower of the general character indicated and embodying a novel articulated arrangement of its component parts by means of which extreme flexibility in passing over uneven ground, vertical shift between transport and working positions, and rearward movement of the mower bar upon hitting an obstruction, are all correlated so that none of the provisions for any one of those several operations interferes with any other.

Still another object is to provide a mower attachment for tractors embodying a power actuated lift mechanism for raising the mower bar, and which is of a novel character permitting freedom of rearward swing of the mower bar upon hitting an obstruction.

Further objects and advantages of the invention will become apparent as the following description proceeds, taken in connection with the accompanying drawings, in which:

Figs. 4 and 5 are views similar to Fig. 1, but on a reduced scale and showing the implement, respectively, in its lowered and working position and in its elevated or transport position.

Fig. 6 is another plan view similar to Fig. 3 but showing the implement in its disabled or rearwardly swung position which it assumes when the mower bar hits an obstruction, and as contrasted with the normal working position of Fig. 3.

Fig. 7 is an enlarged detail sectional view of the break-out latch included in the illustrated implement.

Fig. 8 is an enlarged detail perspective view of an intermediate element which pivotally connects the two main frame portions of the implement.

Figure 1:
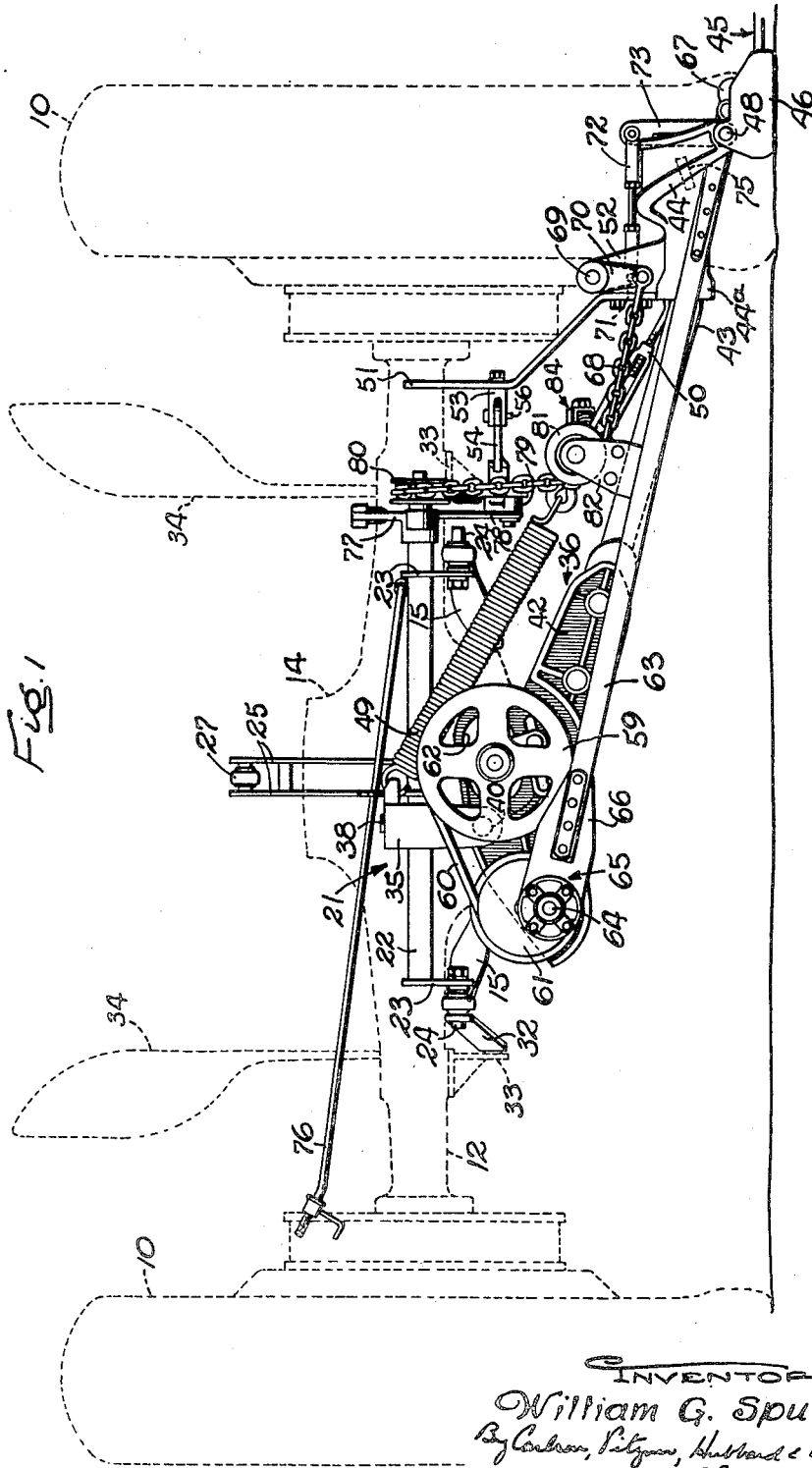
Figure 1 is a rear elevation of a mower attachment embodying the present invention, the mower bar being broken away and the attachment being shown as applied to a tractor whose rear end portion is indicated simply in dotted outline.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the embodiment of the invention illustrated in the drawings, the latter shows my novel mower attachment applied to a tractor, the rear end portion of which appears in dotted outline in Fig. 1. Upon reference to Figs. 1 to 3, those skilled in the art will recognize the particular tractor illustrated as being the well-known Ford lightweight agricultural tractor equipped with the draft linkage of the Ferguson system. Such tractor is, of course, simply illustrative of one of a variety of tractors to which the present implement may be applied.

As a preliminary to consideration of the implement itself, the illustrated portions of the tractor to which it is shown attached may be briefly identified. As shown, the tractor has a pair of pneumatic tired rear wheels 10 carried on a rear axle 11 in a rear axle housing 12 with a central differential housing 14. Trailing from the rear end portion of the tractor is a pair of laterally spaced draft links 15 connected to the differential housing by universal pivots 16 located below and slightly forward of the rear axle 11. Such draft links 15 are suspended from drop links 17 pivoted to respective ones of the draft links and to respective ones of a pair of crank arms 18 fixed to a rock shaft 19. Such rock shaft forms a part of the power lift device included as standard equipment on certain tractors, and which is shown in detail in Henry George Ferguson Patent No. 2,118,180, issued May 24, 1938. For the present, suffice it to say that when a hand control lever 20 (Fig. 2) is pulled upward, pressure fluid (oil) is admitted to a hydraulic ram (not shown) which rocks the shaft 19 in a direction to raise the crank arms 18, thereby elevating the draft links 15. Conversely, upon swinging the control lever 20 downward, pressure fluid is exhausted from the ram so that the draft links are permitted to swing downward under the gravity effect of their weight and that of any implement or the like attached to them.

To the trailing ends of the tractor borne draft links 15 is attached a first frame, designated generally as 21 (Fig. 1), for effecting not only haulage of the same by the tractor, but also bodily lifting and lowering of the frame by the power operated draft links. Such frame 21 includes a transverse bar 22 having depending brackets 23 thereon which are detachably connected by pins 24 with the usual ball joints on the trailing ends of the draft links 15. Rigid with the central portion of the bar 22 is a pair of laterally spaced uprights 25 between the upper ends of which is received the trailing end of a top link 26 universally jointed to the same by a ball joint 27. The forward end of the top link 26 (Fig. 2) is pivoted at 28 to a shackle 29 pivoted on the differential housing 14 and connected to a plunger 30 and compression spring 31 which form a part of the automatic controls for the hydraulic lift device. Such automatic control is not only disclosed in the Ferguson patent identified above, but, in addition, is not employed with the present implement so no further detailing is required, the only point to be noted here being that the top link 26 is pivoted on the rear end portion of the tractor for vertical swing of the link.

A check chain 26a (Fig. 2) connects the frame 21 and top link 26 to limit the downward movement of the frame. The upper end of the chain is adjustably connected to the top link, being received in one of a series of notches in a plate 26b secured to the top link.

A stabilizer link 32 is connected from the trailing end of the left-hand draft link 15 to the left-hand one of a pair of stabilizer brackets 33 (Fig. 1) secured to the rear axle housing 12 at points beneath the mud guards 34.

An intermediate member in the form of a casting 35 interconnects the first frame 21 to a second frame, designated generally as 36, in such manner that the second frame is articulated to swing either horizontally or vertically with reference to the first frame when required. The shape of the intermediate member 35 is shown in detail in Fig. 8. As there appears, it includes an upper portion of horizontal U-shape disposed to embrace the rearwardly projecting portion of a bracket 37 fixed to the transverse bar 22 (see Figs. 2 and 6) as well as a lower portion of inverted U-shape arranged to embrace the upper edge portion of the second frame 36 (see Fig. 2). The intermediate member 35 is pivoted to the bracket 37 by a vertical pivot pin 38 passing through registering holes 39 in the intermediate member, whereas such intermediate member is connected to the second frame 36 by a fore and aft horizontal pivot pin 40 extending through registering holes 41 in the intermediate member. It is about the pivot pins 38 and 40 that the second frame 36 swings respectively in a horizontal and vertical direction with reference to the first frame 31.

The second frame 36 itself comprises a casting 42 (Figs. 1 and 2) which is suitably webbed for reenforcement purposes and from which projects laterally a rigidly attached tubular supporting arm 43. On the outer end of the arm 43 is mounted a downwardly facing yoke 44 having a tubular portion 44a telescoped over the end of the arm and adapted to turn with reference to the latter about the axis of the end portion of such arm in adjusting the pitch of the mower bar, as will presently appear.

The mower bar itself, designated generally as 45, may be of conventional construction and includes a ground shoe 46 at its inner end, as well as a longitudinally reciprocable knife 47. The ground shoe 46 is pivoted at 48 to the depending arms of the yoke 44 for vertical swinging movement of the mower bar.

A strong counterbalance spring 49 (Fig. 1) is arranged with one end hooked to a lug on the intermediate member 35 and the other connected by a turnbuckle 50 with the yoke 44 to aid in sustaining a portion of the weight of the second frame 36 and attached mower bar. The spring 49 has sufficient yield, however, so that the shoe 46 will remain in contact with the ground so long as the implement is in lowered or working position.

For adjusting the pitch of the mower bar 45, a hand lever 51 (Figs. 1 and 3) is utilized. Such hand lever is bolted to an upright projection 52 rigid with the yoke 44 so that as the lever is moved fore and aft the yoke will be turned angularly about the end of the frame arm 43. A clevis 53 on the lever 51 embraces a forwardly extending bar 54 secured at its forward end to an anchorage clip 55 whose mounting will hereinafter be described. A pin 56 passed through the clevis 53 and a corresponding one of a series of holes 57 in the bar 54 anchors the lever 51 in desired adjusted position.

The knife 47 of the mower bar is reciprocated by drive connections from a power take-off 57 (Figs. 2 and 3) at the rear end of the tractor. For that purpose, a suitably articulated drive shaft 58, whose construction will later appear, connects the power take-off shaft 57 to a pulley 59. The latter is in turn connected by a V-belt 60 with a combination pulley, flywheel and crank 61. The latter element is journaled by suitable bearings in the frame casting 42, whereas the first mentioned pulley 59 is journaled in a bearing block (not shown) which is slidably adjustable in a slot 62 (Fig. 1) in that same casting so that the pulley 59 may be shifted bodily toward and from the pulley 61 for effecting a desired tensioning of the belt.

A pitman 63 (Figs. 1 and 3) is connected at one end to a crank pin 64 on the pulley 61 and at the other end to the head of the knife 47. Thus, a bearing assembly 65 is journaled on the crank pin 64 and connected by a laterally flexible sheet metal plate 66 to the pitman 63, whereas at the lower end of the latter a more or less conventional form of connection to the knife head is employed including a socket member 67 receiving a ball on the knife head.

Provision is made for swinging the mower bar 45 upward about the pivot 48 at its inner end (Figs. 1 and 4) by tension applied to a flexible line or pull chain 68. Of the novel arrangement for tensioning the chain to raise the bar automatically as an incident to bodily lifting of the implement as a whole by the powered draft links 15, more will appear shortly. First, however, attention will be given to the detail of the lost motion type of connection between the chain 68 and the mower bar, and by means of which free vertical motion of the bar as it passes over uneven ground is permitted without interference from the pull chain. As to that connection, it will be observed upon reference to Fig. 1 that a transverse shaft 69 is journaled in the upper end of the arm 52 which rises from the yoke casting and is integral with the latter. Rigid with the shaft 69 are depending crank arms 70 and 71 located on opposite sides of the upright arm 52 (see also Fig. 3). To the arm 70 is connected one end of the pull chain 68 and to the end of the other arm 71 is connected a turnbuckle 72. The opposite or outer end of this turnbuckle is pivoted to a lever 73 pivoted at its lower end on the adjacent ones of the pivot pin 48 which connect the yoke 44 to the ground shoe 46. Coacting with the lever 73 is a pair of stops 74, 75 fixed respectively to the ground shoe 46 and to the yoke 44 (see Fig. 2 and also Figs. 1 and 3).

The lever 73 normally abuts against the stop 74 when the mower bar is horizontal. There is, however, sufficient yield to the motion of the chain (by interposition of a spring 83 hereinafter further identified) so that the mower bar may swing downward a substantial distance. And as the mower bar swings upward the stop 74 can leave the lever 73 so there is no interference with such movement. The mower bar is thus free to rise and fall in following changes in ground slope. During power lifting of the mower bar, tensioning of the pull chain 68 swings the lever 73 counterclockwise (as viewed in Fig. 4) and by reason of lever's abutment with the stop 74 swings the mower bar upward to the broken line position indicated in Fig. 4. After about 15° of such upward swing, further tilting of the lever 73 is prevented by its abutment against the stop 75 on the yoke 44, the latter stop being positioned out of contact with the lever when in its normal vertical position. Consequently, still further pull on the chain 68, after the lever reaches stop 75, results in a lifting or upward swing of the second frame 36, in its entirety, from the position of Fig. 4 to that of Fig. 5. It will be perceived that the arrangement is such as to effect a sequential lifting of the mower bar and of the frame to which it is pivoted, all in response to simply a pull on the chain 68 and while still leaving the mower bar free to rise and fall in passing over uneven ground during operation.

The lifting of the second frame 36 to the position shown in Fig. 5, but with the mower bar 45 projecting outward therefrom in a partially lifted position with reference to such second frame, elevates the mower bar sufficiently with reference to the ground to pass over stumps or such obstructions. In the event that the operator wishes to locate the mower bar in the fully upright position shown in Fig. 5 for purposes of transport, he steps down from the tractor and swings the mower bar on up to upright position by hand. Then the mower bar is locked in such position by fastening to it a brace rod 76 pivoted on the transverse frame member 22 so that it may lie across the implement when not in use (Fig. 3), being held by a spring clip 76a.

Figure 2:
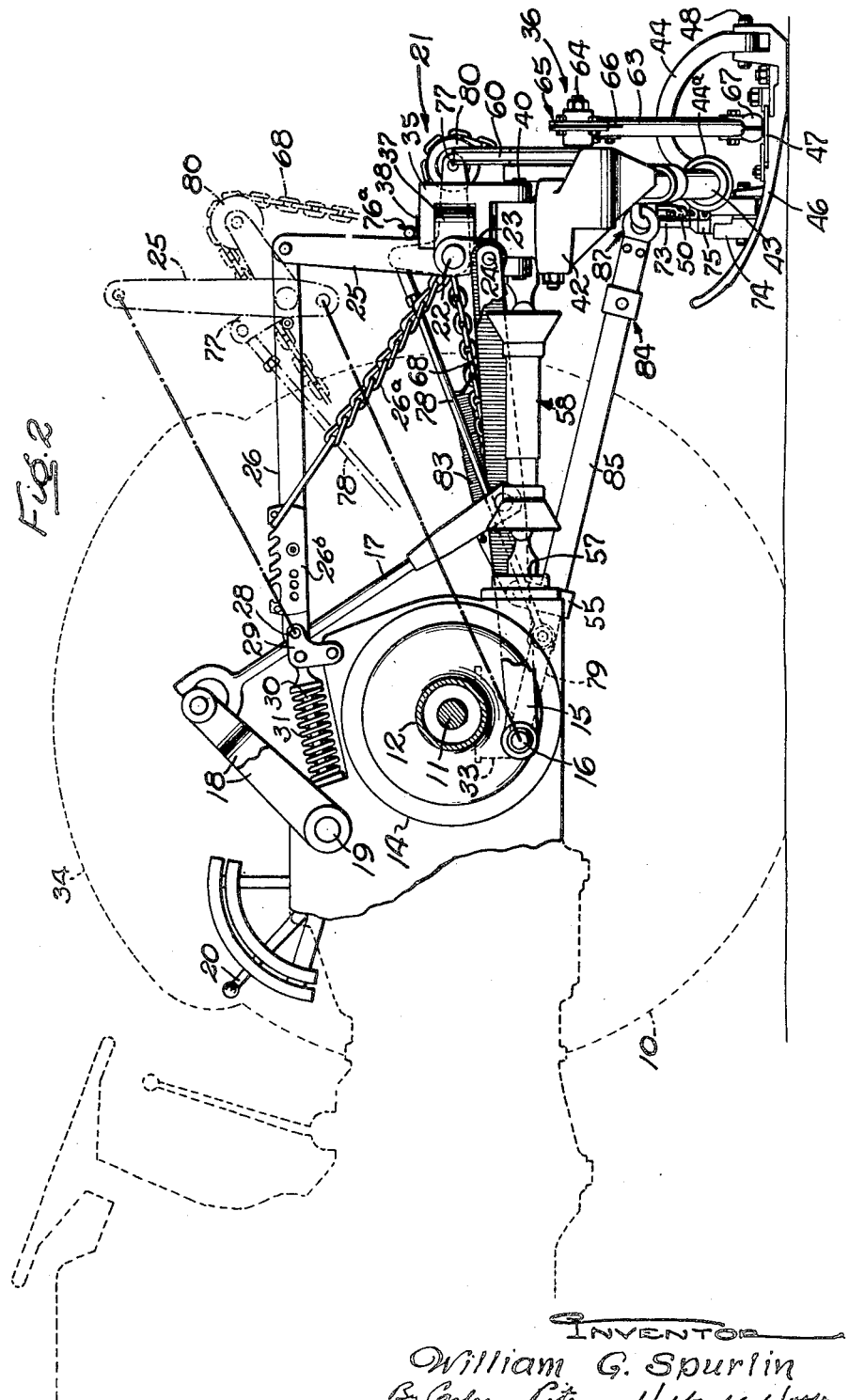
Fig. 2 is an end elevation of the installation shown in Fig. 1, only the rear end portion of the tractor being shown in full lines and the near rear wheel of the tractor being removed to avoid any obstruction of the view of the implement or attachment.

To effect tensioning of the pull chain 68, power is derived for the movement of the power operated draft links 15. For that purpose, a bell crank 77 is pivoted on the upright end of the transverse frame bar 22 (see Fig. 2 and also Fig. 1) which is borne by the trailing ends of the draft links 15. This bell crank is arranged to rock fore and aft of the tractor and includes an upstanding arm to which is pivoted a push rod or force transmitting link 78, the forward end of the latter being pivoted to a mounting member or bracket 79 which is in turn secured to the right-hand one of the stabilizer brackets 33 on the tractor (Figs. 1 and 2). On the other or rearwardly extending arm of the bell crank 77 is journaled a sheave 80 over which the pull chain 68 is trained after passing over an idler sheave 81 journaled in the bracket 82 fixed to the frame arm 43. The chain 68 is carried on forward from the sheave 80, toward the tractor, and its forward end connected to the anchorage clip 55 heretofore identified. The chain thus forms a loop having the forward end thereof anchored. The sheave 80 pressing outwardly on the loop tends to enlarge or elongate it resulting in movement of the "free" end at the mower assembly. The spring 83 is connected at one end to the clip 55 and at the other end to the chain (Fig. 3) so that the length of chain spanned by this spring is normally a little slack, thus affording some yield for downward swing of the mower bar below horizontal position as previously mentioned.

When the hydraulic power unit on the tractor is caused to swing the draft links 15 upward, the bell crank 77 is rocked forward to the broken line position illustrated in Fig. 2 by the rod 78. Such rocking of the bell crank ensues since the point of pivoting for the forward end of the rod 78 is displaced with reference to the pivotal axis for the draft links 15. Similarly as the draft links are lowered, the bell crank 77 is rocked rearwardly to the full line position shown in Fig. 2. Rocking of the bell crank raises and lowers the sheave 80 with reference to the guide sheave 81 and point of anchorage of the forward end of the chain so that the length of the path defined for the chain between such points is correspondingly altered. As a result, when the draft links 15 are raised, the chain 68 is pulled upward raising the mower bar 45 and thereafter the frame 36, whereas when the draft links are lowered the chain is slacked off for gravity lowering of the mower bar and its supporting frame into working position.

Rearward swing of the mower bar 45 or so-called break-out of the same is permitted in the event it hits a fixed obstruction, such as a stump or rock. In the present implement, the entire second frame 36 and attached mower bar, as well as the drive mechanism carried on such frame, are permitted to swing rearwardly as a unit about the pivot 38 from the position of Fig. 3 to that of Fig. 6. A releasable connection, which will give way upon imposition of a predetermined resistance to advance of the mower bar, is provided for holding such unitary assembly in normal operating position. In this instance, the releasable connection comprises a latch, designated generally as 84, arranged to connect an overlapping pair of drag links 85, 86. The trailing end of the link 85 is pivoted to an intermediate portion of the second frame 36, as indicated at 87, while the leading end of the other link 86 is pivoted to the supporting bracket 79 previously mentioned as carrying the forward end of the rod 78.

Figure 3:
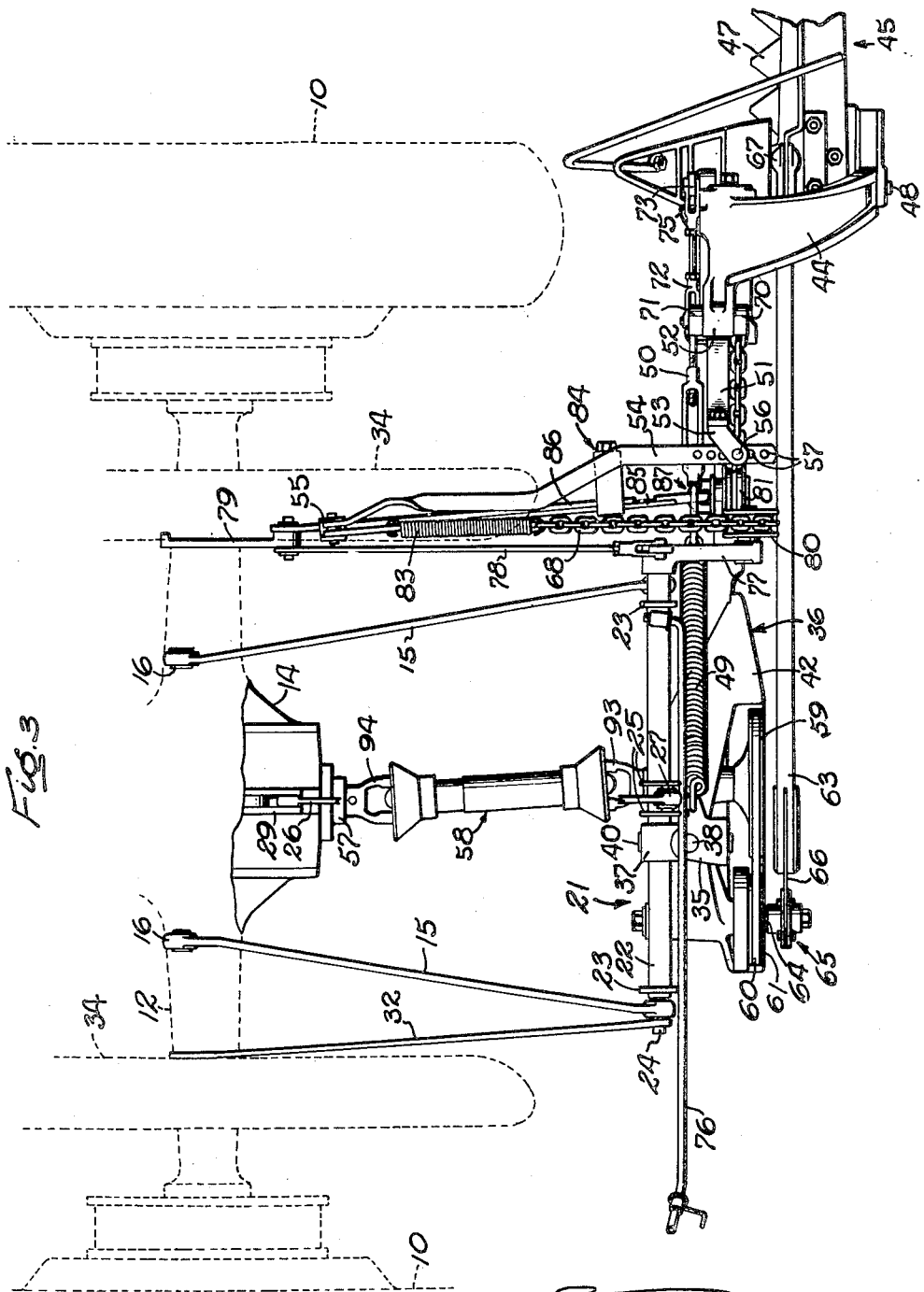
Fig. 3 is a plan view of the installation shown in Figs. 1 and 2.

Normally, the latch 84 retains the links 85, 86 substantially fully overlapped in the position shown in Fig. 3 and in which the mower bar 45 projects laterally of the tractor substantially at right angles to the path of travel of the latter. Release of the latch permits the link 85 to slide rearwardly of the link 86 (see Fig. 6).

In the construction illustrated, the latch 84 (see Fig. 7) includes a ball 88 seated in a recess 89 in the link 85 and arranged to pass through a registering hole 90 in the link 86. A plunger comprising a bolt 91 with a nut 92 threaded on it is urged by compression spring 93 to press the ball 88 forward into the recess or socket 89. Such spring is interposed between the nut 92 and a generally rectangular housing 94 fixed to the link 86 and slidably guiding the bolt 91. By threading the bolt into and out of the nut 92, the compression of the spring 93 may be varied at will to adjust the force required to release the latch. Upon application of an excessive drag to the link 85, it squeezes the ball 88 out of the recess 89 against the compression of the spring 93.

Special provision is made to prevent interference by either the pitch adjusting mechanism or elevating mechanism for the mower bar 45 with the latter's break-out movement. It is for that purpose that the anchorage clip 55, for the forward ends of both the pull chain 68 and the bar 54 of the pitch adjusting mechanism, is secured to the leading end of the movable drag link 85. Since the anchorage clip 55 is secured to this link, neither the bar 54 nor lifting chain 68 will interfere with the break-out movement of the mower bar, but instead will move rearwardly with such link 85 and as a part of the rearwardly movable unitary assembly previously mentioned. It will thus be seen that even though power for lifting the mower bar and its supporting frame 36 is derived from the tractor, nevertheless the arrangement is such that no fixed connection to the tractor for lifting purposes is required and which would otherwise interfere with break-out.

Since the second frame 36, bearing the drive pulley 59, swings rearward upon break-out, there must of necessity be some provision for elongation of the drive shaft 58 connecting that pulley to the power take-off 57. It is convenient to utilize that elongation for automatically interrupting the drive connection so that drive of the knife 47 will be automatically stopped upon break-out. The drive shaft 58 is accordingly so arranged.

In the present instance, the shaft assembly 58 is shown (Fig. 6) as including an axially slidable coupling including a squared shaft 90 adapted to be received within a complementally shaped socket 91 in a shaft member 92. The shaft 90 and shaft member 92 are connected by respective universal joints 93 and 94 with the pulley 59 and power take-off shaft 57. The shaft 90 is short enough with respect to the socket 91 so that it will be pulled out of it and thus interrupt the drive connection whenever the mower bar swings rearwardly on break-out and also whenever the implement is hoisted in the transport position shown in Fig. 5. The shaft 90 is, however, retained in axial alinement with the socket 91 so that they may be readily reengaged when desired by the simple expedient of providing telescoping sleeve portions 95 and 96 rigid with the the shaft members 90 and 92 respectively, and of sufficient length to remain telescoped throughout the normal range of either rearward or upward movement of the second frame 36.

The operation of the disclosed implement will in general be clear from the foregoing. By way of brief recapitulation, it may be assumed first of all that the implement is in its lowered or normal operating position shown in Figs. 1 and 4. The driver initiates reciprocation of the knife 47 by engaging the usual clutch (not shown) to connect the power take-off shaft to the tractor engine. Then as the tractor is driven forward, the mower attachment is hauled along behind it carrying on the mowing operation in the usual manner. While in such working position a major portion of weight of the implement or mower attachment is borne by the tractor through the connecting linkage 15, 26 with the mower bar 45, however, resting upon and gliding along the ground. The lost motion connection of the mower bar to the hoist mechanism permits the mower bar to rise and fall through a large angle, thus conforming to changes in ground contour. This is especially useful in mowing along slopes which either rise from or fall away from the side of the tractor.

Should the mower bar 45 hit an obstruction sufficiently immovable to disengage the latch 84, the mower bar is permitted to swing rearwardly relative to the tractor as the latter advances somewhat while the driver brings it to a halt. The degree of rearward swing permitted is limited simply by engagement of the intermediate member 35 with the casting 37 on the transverse bar 22 and may be in the order of about 50°. It will be noted in passing that the elevated location of the transverse bar 22 included in the first frame 21, permits the left end of the second frame 36 and parts borne by the latter to swing beneath such bar 22 without striking it (see Figs. 1 and 6).

After break-out, the driver backs up the tractor and, since the mower bar does not slide rearwardly on the ground very easily, the drag link 85 is shoved forward along the rearwardly moving companion link 86 until the latch 84 reengages. Simultaneously the squared drive shaft 90 is pushed back into the socket 91 reestablishing the drive connection for the mower.

Having restored the mower to operative condition after break-out, the operator raises the mower to clear the obstruction, preparatory to again advancing the tractor, by shifting the hydraulic control lever (see Fig. 2) upward. This accomplishes a bodily lifting of the entire mower by the draft links 15 and at the same time the resultant rocking of the bell crank 77 pulls up the chain 68 so that it sequentially lifts the mower bar and second frame 36. With the mower bar thus elevated some 15° or so with reference to the second frame 36 and the latter hoisted, as well as the whole implement bodily lifted, the mower bar is high enough to pass over almost any obstruction that is likely to be encountered in the field. To resume mowing, the operator has only to return the control lever 20 to lowering position whereupon the draft links 15 swing downward under the gravity load of the implement.

In case the implement is to be transported for some distance, and particularly along a road where lateral clearance is limited, the implement is hoisted by power as before and the mower bar then swung up by hand to the upright position shown in Fig. 5 and locked in position by the brace rod 76 as there indicated.

To disconnect the implement from the tractor is a simple matter. For that purpose, the operator has only to remove the pivot pins at the trailing ends of the lower links 15 and top link 26 and unpin the supporting plate 79 from its associated stabilizer bracket 33. Thereafter the tractor can be driven away and another implement hitched on, the top link 26 being removed and replaced by some special top link for the other implement if that be required.

I claim as my invention:

1. In a mower attachment for a tractor having a pair of laterally spaced draft links trailingly pivoted on its rear end portion and connected to a power lift device on the tractor for vertical shifting movement of said links, a frame arranged to span the links, means for detachably connecting said frame to the links for bodily lifting and lowering of such frame, a supporting arm, means pivoting said arm at one end to said frame to swing upward from a normal downwardly inclined and laterally projecting position, a mower bar pivoted on the outer end of said arm to swing vertically with reference thereto, a lever pivoted on said frame to rock fore and aft thereon, means including a force transmitting link connected to said lever and extending forwardly therefrom for attachment to a tractor borne pivot point eccentric to the pivotal axis of the draft links for rocking said lever as an incident to vertical movement of said frame by the draft links, means including a flexible line connected at one end to said mower bar and adapted to be anchored at the other end adjacent the rear end of the tractor for raising said bar and arm upon tensioning of said line, and means on said lever engageable with an intermediate portion of said line to tension the same in response to rocking of said lever as an incident to bodily lift of said frame by the draft links.

2. In a mower attachment for a tractor having a pair of laterally spaced draft links trailingly pivoted on its rear end portion and connected to a power lift device on the tractor for vertical shifting movement of said links, a frame arranged to span the links, means for detachably connecting said frame to the links for bodily lifting and lowering of such frame, a supporting arm, means pivoting said arm at one end to said frame to swing upward from a normal downwardly inclined and laterally projecting position, a mower bar pivoted on the outer end of said arm to swing vertically with reference thereto, a bell crank lever pivoted on said frame to rock fore and aft thereon about a horizontal axis, means including a force transmitting link connected to a first arm of said bell crank lever and extending forwardly therefrom for attachment to a tractor borne pivot eccentric to the pivotal axis of the draft links for rocking said lever as an incident to vertical movement of said frame by the draft links, means including a flexible line connected at one end to said mower bar and adapted to be anchored at the other end adjacent the rear end of the tractor for raising said bar upon tensioning of said line, a guide sheave mounted on said supporting arm and over which the portion of said line leading from said bar is trained, and a second sheave on the second arm of said bell crank lever over which the portion of said line leading from the first mentioned sheave toward the tractor is trained.

3. In an implement for a tractor having a draft link trailingly pivoted to its rear end portion for vertical movement by power lift device on the tractor connected to such link, the combination of an implement frame adapted to be connected to said link for bodily lifting and lowering thereby, a bell crank lever pivoted on said frame to rock fore and aft thereon, means for rocking said lever as an incident to bodily raising and lowering of said frame by the draft link and including a force transmitting link connected at one end to the first arm of said bell crank lever and having means on its other end for connection of the same to the tractor at a point eccentric to the pivotal axis of the draft link, an element movably connected to said frame, a flexible line anchored at one end adjacent the rear end of the tractor and at the other end to said element, and means including a guide carried by the second arm of said bell crank lever and having said line trained thereover for tensioning and slacking off said line to move said element in accordance with the rocking of said lever incident to the raising and lowering of said frame by the draft link.

4. In a mower attachment for a tractor having a draft link trailingly pivoted at its rear end portion for vertical movement by a power lift device on the tractor connected to such link, the combination of a frame structure adapted to be connected to said link for bodily lifting and lowering thereby, a lever pivoted on said frame to rock fore and aft thereon, means for rocking said lever as an incident to bodily raising and lowering of said frame by the draft link and including a force transmitting link connected at one end to said lever and having means at the other end for connection of the same to the tractor at a point eccentric to the pivotal axis of the draft link, a mower bar projecting laterally from said frame structure and pivoted thereto for vertical swinging movement, a loop of flexible line, said loop having one end anchored adjacent the rear end of the tractor and having its other end connected to an operating arm projecting generally upward from said mower bar, and means including a guide carried by said lever and having said line trained thereover for tensioning and slacking off said loop of line to respectively raise and lower said mower bar in accordance with the rocking of said lever incident to raising and lowering of said frame by the draft link.

5. In a mower attachment for a tractor having a pair of laterally spaced draft links trailingly pivoted on its rear axle housing for vertical movement by a power lift device on the tractor connected to such links, the combination of a frame adapted to be connected to the draft links in spanning relation to their rear end portions for bodily lifting and lowering by the links, a supporting arm pivoted on said frame to swing vertically with reference thereto and having a mower bar projecting laterally from its outer end, said mower bar being pivoted to said supporting arm to swing vertically with reference to the latter, a lever pivoted on the end portion of said frame adjacent said mower bar to rock fore and aft on said frame, means for rocking said lever as an incident to bodily raising and lowering of said frame by the draft links and including a force transmitting link connected at one end to said lever and having means at the other end for connecting the same to the rear axle housing of the tractor at a point eccentric to the pivotal axis of the draft links and substantially directly forward of said end portion of said frame, a flexible line having means for anchoring the same at one end adjacent the rear end of the tractor, means for connecting its other end of said line to the mower bar, and means including a guide carried by said lever and having said line trained thereover for tensioning and slacking off said line to raise and lower said mower bar and supporting arm therefor in accordance with the rocking of said lever incident to raising and lowering of said frame by the draft links.

6. In a mower attachment for a tractor having a draft link trailingly pivoted on its rear end portion for vertical movement by a power lift device on the tractor connected to such link, the combination of a frame adapted to be connected to the draft link for bodily lifting and lowering thereby, a supporting arm pivoted on said frame to swing vertically with reference thereto, and having a mower bar projecting laterally from its outer end, said mower bar being pivoted to said arm to swing vertically with reference to the latter, a generally upright operating lever rockably mounted on said mower bar at a point substantially coincident with the axis of pivotal connection of the latter to said supporting arm, a guide sheave carried by said frame, a loop of flexible line connected at one end to said lever and at its other end to the tractor with the central portion thereof trained over said sheave, means operable in response to elevation of the frame by the draft link for urging said sheave outwardly with respect to said loop and tensioning said line, and a pair of abutments fixed respectively to said bar and to said supporting arm and disposed for sequential contact in the order named with said lever upon rocking of the latter by tensioning of said line.

7. In a mower attachment for a tractor having a draft link trailingly pivoted on its rear end portion and connected to a lower lift device on the tractor for vertical swing of such link by said device, the combination of a frame, means for connecting said frame to the draft link for haulage thereby as well as for bodily lifting movement by the same, a mower bar, means including an arm for pivotally connecting said bar to said frame for both vertical and rearward movement with reference thereto, overload means for releasably retaining said bar against rearward swing with reference to said frame, a lever rockably mounted on said frame and having a guide at the end thereof, means for rocking said lever in response to bodily lifting and lowering of said frame by the draft link, a flexible operating line trained over said guide and operatively connected to said bar for raising the same upon upward rocking movement thereof, and an anchoring member for said line for normally anchoring the same relative to the tractor, said anchoring member being connected to said arm for movement therewith so that the arm is free to move rearwardly free of restraint from said line.

8. In a mower attachment for a tractor, the combination of a support having a mower bar projecting laterally therefrom and pivoted thereto to swing vertically, frame means for detachably connecting said support in trailed relation to the tractor while leaving said support free to swing rearwardly as a unit about a vertical axis displaced inboard of the inner end of said mower bar, a pair of drag links adapted to be connected respectively to the tractor and to said unit, a releasable connection between said drag links adapted to release them for longitudinal sliding movement relative to each other upon application thereto of a predetermined tension and normally holding them together in position such that said bar projects laterally in working position, a lifting member movably mounted on said frame means, means including a flexible line trained over said lifting member and connected to said mower bar as well as to an anchorage member for raising and lowering of said bar in response to movement of said lifting member and means for fixing said anchorage member to the one of said drag links connected to said unit.

9. In a mower attachment for a tractor, the combination of a support having a mower bar projecting laterally therefrom and pivoted thereto to swing vertically as well as for twisting of said bar about its longitudinal axis to vary its pitch, frame means for detachably connecting said support in trailed relation to the tractor while leaving said support free to swing rearwardly, a pair of drag links adapted to be connected respectively to the tractor and to said support, a releasable connection between said drag links adapted to release them for longitudinal sliding movement relative to each other upon the application of a predetermined tension thereto and normally holding them together in such position that said bar projects laterally in working position, a lifting member movably mounted on said frame means, means including a flexible line trained over said lifting member and connected to said mower bar for raising and lowering said bar in response to movement of said lifting member, a pitch adjusting lever connected to said bar, a holding member adapted to be releasably connected to said pitch adjusting lever for retaining the latter in predetermined position, and means for connecting both said holding member and said line to the one of said drag links connected to said support for movement therewith upon release of said releasable connection.

10. In a mower attachment for a tractor having a pair of laterally spaced draft links trailingly pivoted on its rear end portion and connected to a power lift device on the tractor for vertical swinging movement by the same, the combination of a first frame having spaced connectors for detachable connection to the ends of the respective draft links for haulage as well as for bodily lifting and lowering by the same, a second frame including an integral laterally-extending supporting arm pivoted on said first frame at an elevated point in the vicinity of the connectors and swingable about a rearwardly extending axis between a normal lowered position in which the outer end of the arm is closely adjacent the ground and an elevated position in which the arm extends generally horizontally, a mower bar carried by said arm and projecting laterally from the lower end of the latter, and mechanism having one portion adapted for anchoring adjacent the tractor and another portion arranged for movement with the draft links for effecting an upward swing of said second frame and its attached mower bar with reference to said first frame and about the pivot connection between the frames in response to bodily lifting of the first frame by the draft links.

11. In a mower attachment for a tractor having a pair of laterally spaced draft links trailingly pivoted on its rear end portion and connected to a power lift device on the tractor for vertical swinging movement by the same, the combination of a first frame having spaced connectors for detachable connection to the ends of the respective draft links for haulage as well as for bodily lifting and lowering by the same, a second frame including an integral laterally-extending supporting arm pivoted on said first frame at a point lying generally between the connectors and swingable about a rearwardly extending axis between a normal lowered position in which the outer end of the arm is closely adjacent the ground and an elevated position in which the arm extends generally horizontal, a mower bar projecting laterally from the outer end of said arm and pivoted thereto for vertical swinging movement, and mechanism having portions adapted for connection to the tractor and links respectively for effecting a sequential upward swing of said mower bar with reference to said second frame and thereafter an upward swing of said second frame with reference to said first frame about their pivot connections all in response to bodily lifting of said first frame by the draft links.

12. In a mower attachment for a tractor having a pair of laterally spaced draft links trailingly pivoted on its rear end portion and connected to a power lift device on the tractor for vertical swinging movement by the same, the combination of a first frame having spaced connectors for detachable connection to the ends of the respective draft links for haulage as well as for bodily lifting and lowering by the same, a second frame including an integral laterally extending supporting arm pivoted on said first frame at a point between the connectors and swingable about a rearwardly extending axis between a normal lowered position in which the outer end of the arm is closely adjacent the ground and an elevated position in which the arm extends generally horizontally, a mower bar carried by said arm and projecting laterally from the lower end of the latter, and means including an operator actuated by movement of the links with respect to the tractor for automatically effecting an upward swing of said second frame and its attached mower bar with reference to said first frame and about the pivot connection between the frames in response to bodily lifting of the first frame by the draft links.

13. In an implement for a tractor having a pair of laterally spaced draft links trailingly pivoted to its rear end portion for vertical movement by a power lift device on the tractor, the combination of an implement frame having spaced connectors for detachable connection to the ends of the respective draft links, a lever pivoted on said frame to rock fore and aft thereon, means for rocking said lever as an incident to bodily raising and lowering of said frame by the draft links, said rocking means including a force transmitting link connected at one end to said lever and having means at its other end for connection of the rod to the tractor at a point eccentric to the pivotal axis of the draft links, an implement supporting arm pivoted to said frame at a point lying between the rear ends of the draft links and having an implement connected thereto, a flexible line adapted to be anchored at one end adjacent the rear end of the tractor and operatively connected at the outer end to said supporting arm, and means including a guide carried by said lever and having said line trained thereover for tensioning and slacking off said line to swing the supporting arm upwardly from a normal lowered position to a raised position incident to the raising of the implement frame by the draft links.

14. In a mower attachment for a tractor having a pair of laterally spaced draft links trailingly pivoted on its rear end portion and connected to a power lift device on the tractor for vertical swinging movement by the same, the combination of a first frame having spaced connectors for detachable connection to the ends of the respective draft links for haulage as well as for bodily lifting and lowering by the same, a second frame including an integral laterally extending supporting arm pivoted on said first frame at a point lying generally between the connectors and swingable about a rearwardly extending axis between a normal lowered position in which the outer end of the arm is closely adjacent the ground and an elevated position in which the arm extends generally horizontal, a mower bar projecting laterally from the outer end of said arm and pivoted thereto for vertical swinging movement, and means including an operator actuated by movement of the links for automatically effecting a sequential upward swing of said mower bar with reference to said second frame and thereafter an upward swing of said second frame with reference to said first frame about their pivot connection in response to bodily lifting of said first frame by the draft links, said operator means including a lost motion connection for permitting rise and fall of the mower bar in passing over uneven ground.

15. A mower attachment for a tractor having a pair of laterally spaced draft links trailingly pivoted on its rear end axle housing for vertical swinging movement by a power lift device on the tractor, the combination of a frame having spaced connectors for detachable connection to the ends of the draft links for haulage as well as for bodily lifting and lowering of the same, a laterally-extending supporting arm having a pivot connection with said frame in the region of the trailing ends of the links and having a mower bar at its outer end, said pivot connection permitting movement of the arm about a vertical axis as well as about an axis extending fore and aft, means including a loop of flexible line having one end operatively connected to the supporting arm in a direction to draw the same upwardly, means for normally anchoring said line with respect to the tractor, means for engaging the loop of line and tending to elongate the same upon upward swinging movement of the draft links so that the supporting arm is swung upwardly in unison therewith, overload means for releasably retaining said arm against rearward swing with respect to the first frame, the anchoring means at the forward end of the line being mounted for movement with said arm upon rearward overload release of the same so that the arm is free to move rearwardly free of restraint from said line.

WILLIAM G. SPURLIN.

REFERENCES CITED

The following references are of record in the file of this patent:

UNITED STATES PATENTS

| Number | Name | Date |
| --- | --- | --- |
| 1,973,993 | Pearson | Sept. 18, 1934 |
| 2,176,992 | Crumb et al. | Oct. 24, 1939 |
| 2,335,510 | Hansen | Nov. 30, 1943 |
| 2,422,044 | Ronning et al. | June 10, 1947 |

Disclaimer 2,502,805.—*William G. Spurlin*, Dearborn, Mich. MOWER ATTACHMENT FOR TRACTORS. Patent dated Apr. 4, 1950. Disclaimer filed Jan. 16, 1951, by the assignee, *Harry Ferguson, Inc.*

Hereby enters this disclaimer to claims 1, 3, 4, 5, and 7 to 15, inclusive, of said patent.

[*Official Gazette February 13, 1951.*]